United States Patent
Mondejar Ruiz-Romano et al.

(10) Patent No.: US 10,612,528 B2
(45) Date of Patent: Apr. 7, 2020

(54) EXTERIOR CLEANING MACHINE IN WIND TURBINE-TOWERS

(71) Applicant: GAMESA INNOVATION & TECHNOLOGY, S.L., Sarriguren (Navarra) (ES)

(72) Inventors: Jose Maria Mondejar Ruiz-Romano, Torremolinos (ES); Jose Ramon Dolera Simarro, Albacete (ES)

(73) Assignee: SIEMENS GAMESA RENEWABLE ENERGY INNOVATION & TECHNOLOGY, S.L., Sarriguren (Navarra) (ES)

( * ) Notice: Subject to any disclaimer, the term of this patent is extended or adjusted under 35 U.S.C. 154(b) by 0 days.

(21) Appl. No.: 15/200,218

(22) Filed: Jul. 1, 2016

(65) Prior Publication Data

US 2017/0051726 A1 Feb. 23, 2017

(30) Foreign Application Priority Data

Aug. 17, 2015 (ES) .................................. 201500609

(51) Int. Cl.
*F03D 80/55* (2016.01)
*F03D 13/40* (2016.01)
(Continued)

(52) U.S. Cl.
CPC ............ *F03D 80/55* (2016.05); *A46B 13/001* (2013.01); *B08B 1/04* (2013.01); *B08B 3/08* (2013.01);
(Continued)

(58) Field of Classification Search
None
See application file for complete search history.

(56) References Cited

U.S. PATENT DOCUMENTS

| 3,298,052 A | 1/1967 | Wolfe | |
|---|---|---|---|
| 4,144,091 A * | 3/1979 | Tran | A47L 1/06 134/6 |

(Continued)

FOREIGN PATENT DOCUMENTS

| CN | 103511192 A | 1/2014 |
|---|---|---|
| EP | 1517033 A1 | 3/2005 |

(Continued)

OTHER PUBLICATIONS

Office Action issued in corresponding Chinese Application 201610682283.1 with English translation thereof.
English translation of the Abstract of CN103511192A.

*Primary Examiner* — Cristi J Tate-Sims
(74) *Attorney, Agent, or Firm* — Ladas & Parry LLP

(57) ABSTRACT

Exterior cleaning machine in wind turbine-towers, which is coupled to lifting means (7) in a parallel direction in relation to the outer surface of a mast (1) of a wind turbine, and wherein said machine comprises at least one flexible roller (2a, 2b) configured to come in contact with part of the surface of a mast (1) of a wind turbine, a plurality of magnets (3) facing part of the outer surface of the mast (1) and configured to attract the machine with regard to said mast (1) via magnetic phenomena; at least one tank (4a, 4b) configured to receive a cleaning product; a plurality of rolling means (5) between the structure and said mast (1); and remote control means (6) of the lifting motion of said machine associated with lifting means (7).

15 Claims, 6 Drawing Sheets

(51) Int. Cl.
  *F03D 13/20*  (2016.01)
  *A46B 13/00*  (2006.01)
  *B08B 1/04*   (2006.01)
  *B08B 3/08*   (2006.01)

(52) U.S. Cl.
  CPC ............ *F03D 13/20* (2016.05); *F03D 13/40* (2016.05); *Y02E 10/72* (2013.01)

(56) References Cited

U.S. PATENT DOCUMENTS

| | | | |
|---|---|---|---|
| 2006/0175465 A1* | 8/2006 | Teichert | B66C 23/207 244/33 |
| 2009/0020361 A1* | 1/2009 | Teichert | E04G 3/30 182/36 |
| 2010/0132738 A1* | 6/2010 | Kumar | B08B 3/022 134/10 |
| 2011/0088723 A1* | 4/2011 | Jensen | B05B 13/0436 134/18 |
| 2012/0003089 A1* | 1/2012 | Byreddy | B08B 1/00 416/61 |
| 2014/0034418 A1* | 2/2014 | Olea Porcel | B66F 11/04 182/2.1 |
| 2016/0144936 A1* | 5/2016 | Sim | B63B 9/00 134/6 |

FOREIGN PATENT DOCUMENTS

| | | | | |
|---|---|---|---|---|
| EP | 1886904 A2 | 2/2008 | | |
| WO | WO-2012158042 A1 * | 11/2012 | ............... | B08B 1/00 |

* cited by examiner

EXTERIOR CLEANING MACHINE IN WIND TURBINE-TOWERS

TECHNICAL FIELD OF THE INVENTION

The present invention relates to an exterior cleaning machine in wind turbine-towers, and to the associated cleaning process, which fall within the wind-powered renewable energy sector, as well as to the conservation and maintenance of said wind turbines.

The main purpose of the exterior cleaning machine in wind turbine-towers which is the object of the invention is for it to be possible to clean, in a fully automated way, the outer surface of a wind turbine mast without the need for qualified workers to undertake vertical work, hence eliminating the risk of said workers suffering work accidents and guaranteeing at all times an efficient, quick, safe and versatile cleaning for any type of mast existing in the wind turbines which are presently used.

BACKGROUND OF THE INVENTION

By way of introduction, it is known the problem related to the maintenance and cleaning of wind turbine blades as both the mast itself; since, due to the vertical construction and large height of the wind turbines themselves as well as the places where they are located, which are usually hard-to-access areas such as mountain peaks or sea areas, their maintenance and cleaning require highly qualified workers and highly specific techniques in order to successfully carry out said maintenance and cleaning tasks.

In this sense, the technique that is most commonly used for exterior cleaning on wind turbine towers involves vertical work by skilled workers, which have a lifeline and a hoist-type anchoring system that sustains said worker from the top portion of the mast, known as nacelle, to the base of the mast itself; thus, the worker proceeds to go sliding down and cleaning the outer surface of the mast with pressurized guns or similar cleaning means. However, said technique has a series of drawbacks:

First of all and most importantly, workers' safety is a big concern, since vertical jobs pose a high risk of falls or impacting the mast itself, since at the areas above of the mast the existing wind can be of high intensity, due to both the height of the mast itself and the location of the wind turbine, which is strategically defined to have the highest possible amount of wind energy.

Secondly, the high cost of employing two or more workers who are in charge of to do said maintenance and cleaning tasks, in addition to the associated specific cleaning equipment.

Finally, the slow response capacity stands towards the owner of the wind turbine, since they depend on the availability of workers of the maintenance and cleaning external companies themselves.

In order to solve these problems, the use of wind turbine cleaning helicopters, which are provided with a tank having cleaning products inside it, as well as one or several pressurized guns, which are operated by workers from inside the helicopter, is generally known; even though it is possible with this maintenance and cleaning alternative to prevent the risk for the health and safety of the workers, since the vertical work as such is done away with, it presents other drawbacks, such as:

The cost of using a helicopter to perform said maintenance tasks is very high by the renting the helicopter, the fuel, the pilot and at least another employee responsible for cleaning said wind turbine.

The risk of getting a helicopter near a wind turbine which, as previously indicated, is located in windy places that can lead air currents that make difficult the helicopter flight, and thus the safety of its occupants.

Finally, again, the slow responsiveness towards the owner of the wind turbine, since it depends on the availability of the helicopter, as well as the pilot and workers of the maintenance and cleaning external companies themselves.

This is why, in view of the existing drawbacks during maintenance and cleaning wind turbine towers, the appearance of a new exterior cleaning machine in wind turbine-towers capable of solving the preceding problems is necessary, such that no vertical work by workers is required, thus preventing the risk of work accidents as much as possible; such that the machine which is the object of the invention does not require high purchase or maintenance cost, so that several machines may be stored in nearby areas, thus guaranteeing fast response capabilities towards the owner of the wind turbine; which can further clean any outer surface of the mast of the wind turbine in a fast and efficient manner; all of the above using a cleaning machine that is simple, easy to install and maintenance, and economically competitive with regard to the state of the art known to date.

DESCRIPTION OF THE INVENTION

The present invention relates to an exterior cleaning machine in wind turbine towers, the latter being metallic towers made of materials such as steel, in order to take advantage of the magnetic properties of the magnets present inside the cleaning machine, which is coupled to lifting means in a parallel direction in relation to the outer surface of a mast of a wind turbine, and wherein said machine comprises:
  at least one flexible roller configured to come in contact with part of the surface of a mast of a wind turbine;
  a plurality of magnets facing part of the outer surface of the mast and configured to attract the machine with regard to said mast;
  at least one tank configured to hold a cleaning product;
  a plurality of rolling means located between the structure and said mast; and
  remote control means of the lifting motion of said machine which are associated with the lifting means.

As can be seen, the machine which is the object of the invention has, on the one hand, a series of lifting means parallel to the outer surface of the mast so that, thanks to said lifting means, the machine can move vertically along the entire mast. On the other hand, the machine has a series of physical entities configured for the maintenance and cleaning of the tower of the wind turbine, wherein some of said physical entities are associated with remote control means for ensuring the automated operation of the machine itself without the need for vertical work by workers.

First of all, said essential physical entities are at least one flexible roller, which is in charge of coming in contact with part of the surface of a mast of a wind turbine and proceeding to remove any surface dirt that might be adhered to the surface of said mast. In order to guarantee that the machine is in the vicinity of the outer surface of the mast and thus to ensure that said flexible roller is in permanent contact with the surface of the mast, it is described the existence of a plurality of magnets facing part of the outer surface of the mast, which are configured to attract the machine with regard to said mast via magnetic phenomena, it being understood that part of the material of the mast is metallic in order to attract the machine towards the mast through the magnetic attraction of the magnets and the metallic surface of said mast.

The use of magnets ensures that the machine will always stay in permanent contact with the mast, irrespective of the environmental and weather conditions existing in the area surrounding the wind turbine. It should be stressed that that the plurality of magnets may be associated with an electrical power source to create a variable magnetic induction between the magnets and the metallic surface of the mast, which can be increased according to an increase in the speed of the prevailing wind, etc.

Afterwards, in order to get that the machine which is the object of the invention to be able to move across the surface of the mast, and thanks to the aforementioned lifting means, it is described the existence of a plurality of rolling means located between the structure and said mast, which may be wheels or rollers, which can be perfectly handleable and easily repaired or replaced in case of break down thereof.

Likewise, in order to guarantee an effective and exhaustive cleaning of the outer surface of the mast, it is described the use of at least one tank configured to receive a cleaning product; see e.g. a detergent and/or a defoamer, located in this embodiment example in two tanks inside the machine itself. Thus, thanks to said at least one roller and to the use of the cleaning product, a perfect finish is achieved in a fast and safe manner.

Finally, in connection to the essential entities of the exterior cleaning machine which is the object of the invention, it is described the existence of the use of remote control means of the lifting motion of said machine which are associated with the lifting means; so that a worker may control, remotely the up-and-down motion of the machine itself from a safe and remote position away from potential accidents during its handling.

Hence, it is achieved suppress the drawbacks related to the aforementioned state of the art since:
Firstly, the need for vertical work by workers is removed, which is the most important drawback to be corrected, and thus the risk of falling or accidents is eliminated.
Secondly, it is worth highlighting that the machine can be remotely operated by just one worker, the manual labour cost thus being lower compared to manual cleaning and maintenance and lower compared to using cleaning helicopters.
Lastly, thanks to the simplicity of the entities that make up the machine which is the object of the invention, the response capabilities towards the owner of the wind turbine are fast.

Regarding a preferred embodiment option, it is worth mentioning that it is possible that the lifting means comprise a motor-operated hoist anchored on the one hand, to the top portion of the mast and, on the other, to the base of the mast; and coupled in turn, to the moving structure. This gives rise to a known lifting mechanism which is safe and perfectly controllable via a motor positioned on the bottom or top portion of the mast. It is necessary to ensure that all anchors are properly fixed and secured to prevent the machine from detaching during its vertical ascent/descent.

In order for a worker to also be able to remotely control the moment of cleaning the surface of the mast, it is described the option in which said at least one tank is associated to a pumping element of the cleaning product to be housed inside said tank, said pumping being controlled via the remote control means. Thus, until the machine is fully positioned with regard to the mast, the worker does not act on the remote control, and he decides when to proceed to pump cleaning product onto said flexible roller.

It is worth mentioning that when it described the use of remote control means, they are preferably controlled from a single control station and by one worker alone via a control having a variable frequency drive.

In this regard, it should be stressed that said at least one flexible roller can be coupled to a motor configured to rotate said flexible roller via its axis of rotation, said rotation being controlled via the remote control means. Thus, the worker can control both the lifting motion of the machine (speed of lifting and lowering), the pumping of cleaning product and the rotation proper of the flexible roller, thus ensuring an optimal cleaning of the surface of the mast of the wind turbine in a safe and simple manner that is perfectly adaptable to any type of wind turbine.

It is worth mentioning that said at least one flexible cylinder may be formed by a plurality of deformable plastic bristles, wherein the cylinder itself has a geometry of revolution formed by two facing truncated cones, their greatest bases being located at the ends of the roller, thus, the central portion is narrower than the ends and enables its adaptability to different geometries of the outer surface of the mast to be cleaned.

Focusing now on the build-up of cleaning product on said roller, the option wherein the machine which is the object of the invention comprises a sponge located in the vicinity of said at least one flexible roller and configured to absorb some of the cleaning product retained in said at least one flexible roller is envisaged. Additionally, said sponge may be coupled to a motor configured to alternately move said sponge with regard to the static position of the axis of rotation of the flexible roller, said alternate motion being controlled via the remote control means, thus providing a greater degree of control to a qualified worker remotely located with regard to the location of the machine.

In order to be able to clean some of the fouled cleaning product, it is described the option in which the machine comprises a retractable lip located in the vicinity of said at least one flexible roller, which has two operating positions:
a first cleaning position, wherein the retractable lip is in contact with the surface of the mast; and
a standby position, wherein the retractable lip is separated a distance with regard to the surface of the mast. Again, the motion of the retractable lip can also be remotely performed via the aforementioned remote control means.

Taking into account that the already fouled cleaning product can spill onto the surface of the mast, the possibility that the machine itself which is the object of the invention comprises a receptacle inferiorly located with regard to said at least one flexible roller and configured to collect waste products after the cleaning of the mast by gravitational action is envisaged, thus, thanks to the receptacle is located below said flexible roller, and bearing in mind that the cleaning is vertical, the waste product gravitationally falls towards the receptacle, it being possible empty it and clean it after the cleaning and maintenance operations of said mast.

In order to prevent potential undesired projections of the cleaning product owing to the rotational motion of the roller itself, it is described the preferred option in which said at least one roller comprises an anti-projection screen, said screen being configured to direct the used cleaning product towards the lower receptacle, wherein said screen is located close to the flexible roller itself, and on its rear portion in the direction of the rotational motion thereof.

Finally, in connection with ensure extraordinary safety measures, the possibility that the machine comprise a safety system against failures of the lifting means is envisaged, wherein said safety system has at least one tie wire anchored, on the one hand, to the machine and, on the other, to the top portion of the mast.

It is worth mentioning that all previously described physical entities located on the machine itself which is the object of the invention have to be situated on a frame (13) that encompasses and positions them, which can be a multitubular frame, a lattice, metal plates, etc. It must be mechanically resistant in order to be lifted with regard to said lifting means and resistant to the external environmental agents created by the cleaning products, rains, and so on.

Likewise, and in connection only to the main entities that make up the exterior cleaning machine which is the object of the invention, a exterior cleaning process in wind turbine-tower, according to said machine, which comprises the following steps, is described below:

a) coupling the machine to the corresponding lifting means with regard to the mast of the wind turbine;

b) positioning the machine in the vicinity of the outer surface of the mast, having the plurality of magnets facing regarding to said surface, attracting the machine to the surface of the mast through the existing magnetic forces, and contacting the rolling means with said surface of the mast;

c) injecting the cleaning product onto said at least one flexible roller;

d) rotating said at least one flexible roller in contact with part of the surface of the mast; and e) actuating, via the remote control means, the lifting of said machine.

It is worth mentioning that, depending on the other optional entities that are included, alternative steps of actuating the motion of the rollers, the retractable lip, the sponge and so on are added.

Thus, a exterior cleaning machine in wind turbine-tower capable of cleaning, in a fully automated manner, the outer surface of a mast of a wind turbine without the need for qualified workers to perform vertical works, hence eliminating the risk of said workers suffering work accidents, in addition to guaranteeing at all times an efficient, quick, safe and versatile cleaning for any type of mast existing in the wind turbines which are presently used, is obtained with the proposed invention.

DESCRIPTION OF THE DRAWINGS

To complete the description being made, and in order to aid for a better understanding of the characteristics of the invention according to a preferred example of a practical embodiment thereof, a set of drawings are provided that form an integral part of this description where, for purposes of illustration and in a non-limiting sense, the following is shown.

PREFERRED EMBODIMENT OF THE INVENTION

Figure 1:
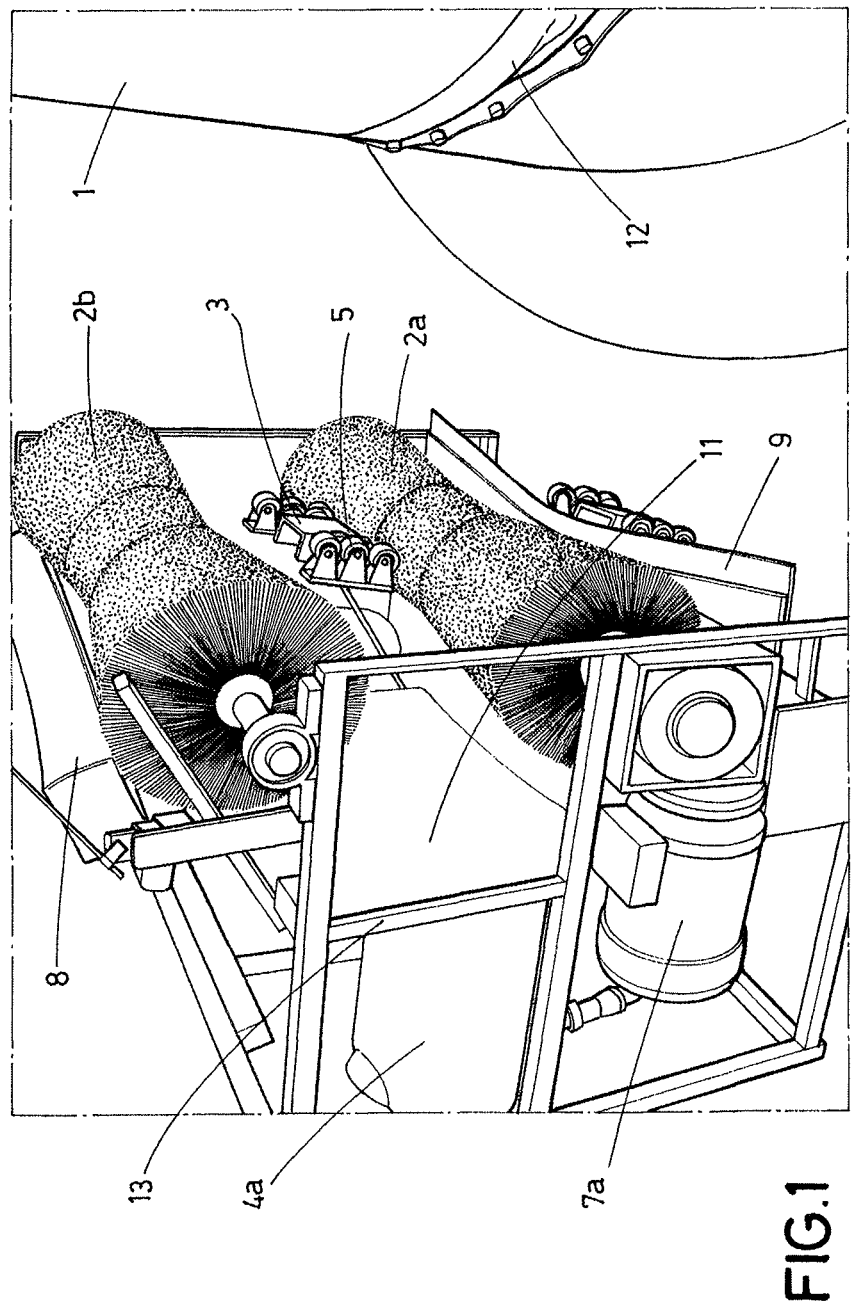
FIG. 1 shows a first three-dimensional view of the cleaning machine which is the object of the invention, located in the vicinity of the base of the mast.
Figure 2:
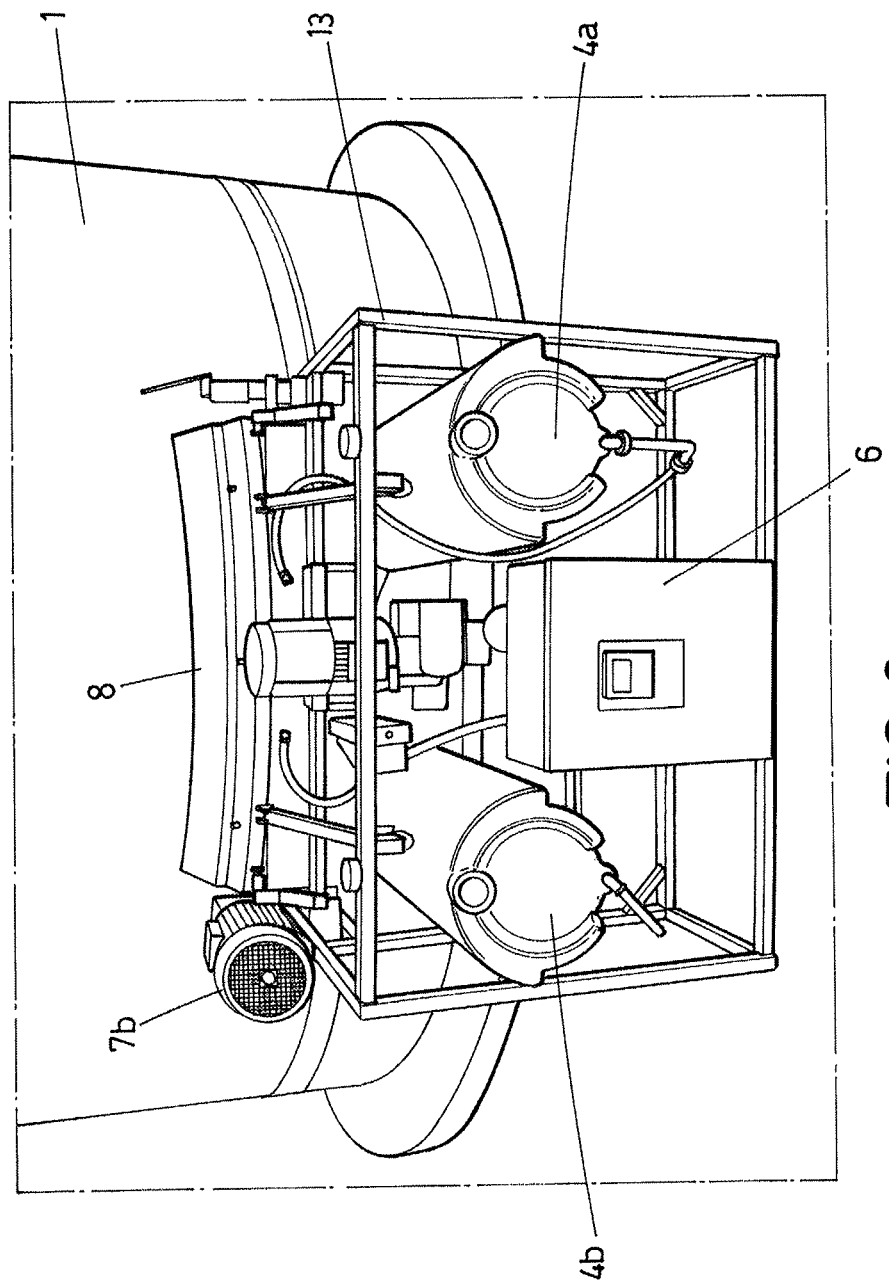
FIG. 2 shows a second three-dimensional view of the cleaning machine which is the object of the invention, where the cleaning product tanks can be seen.

In view of FIGS. 1 to 6, it can be seen how a exterior cleaning machine in wind turbine-tower is coupled to lifting means (7) in a parallel direction in relation to the outer surface of a mast (1) of a wind turbine, which comprise a motor-operated hoist anchored, on the one hand, to the top portion of the mast (1) and, on the other, to the base of the mast (1) and coupled, in turn, to the cleaning machine itself, such that remote control means (6) of the lifting motion of said machine are associated with said lifting means (7). And wherein said machine in turn comprises:

A pair of flexible rollers (2a, 2b), each configured to come in contact with part of the surface of a mast (1) of a wind turbine, wherein each flexible roller (2a, 2b) is coupled to a motor (7a, 7b) configured to rotate said flexible roller (2a, 2b) via its axis of rotation, said rotation being controlled via the remote control means (6).

Figure 3:
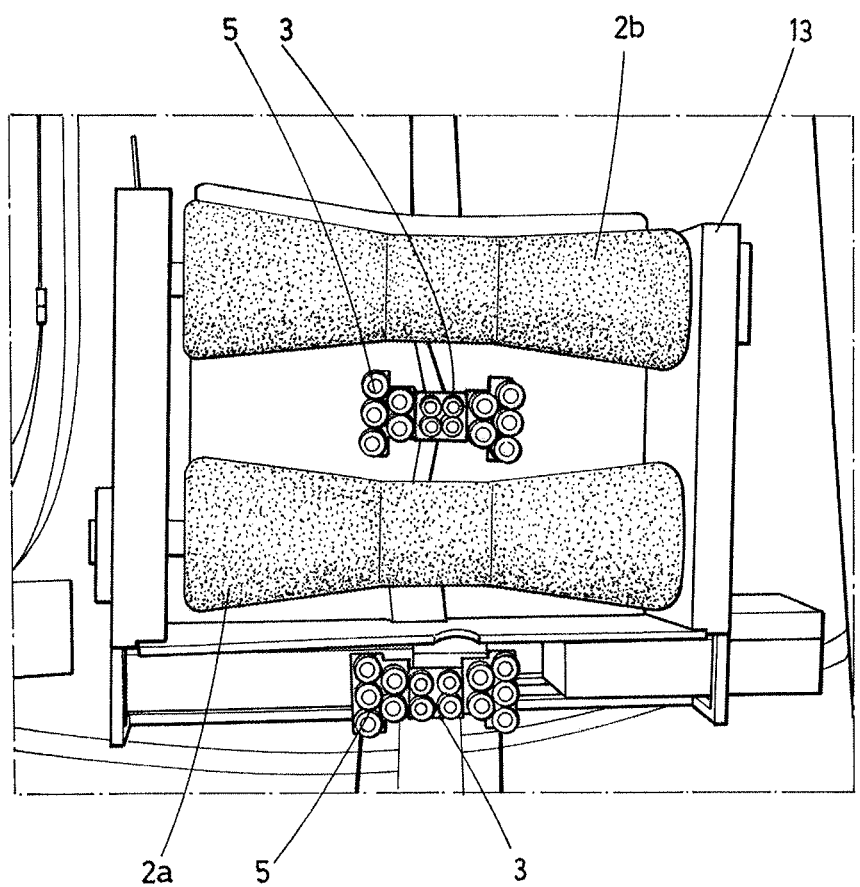
FIG. 3 shows a third three-dimensional view of the cleaning machine which is the object of the invention, where the flexible rollers, the plurality of magnets and the rolling means can be seen.
Figure 4:
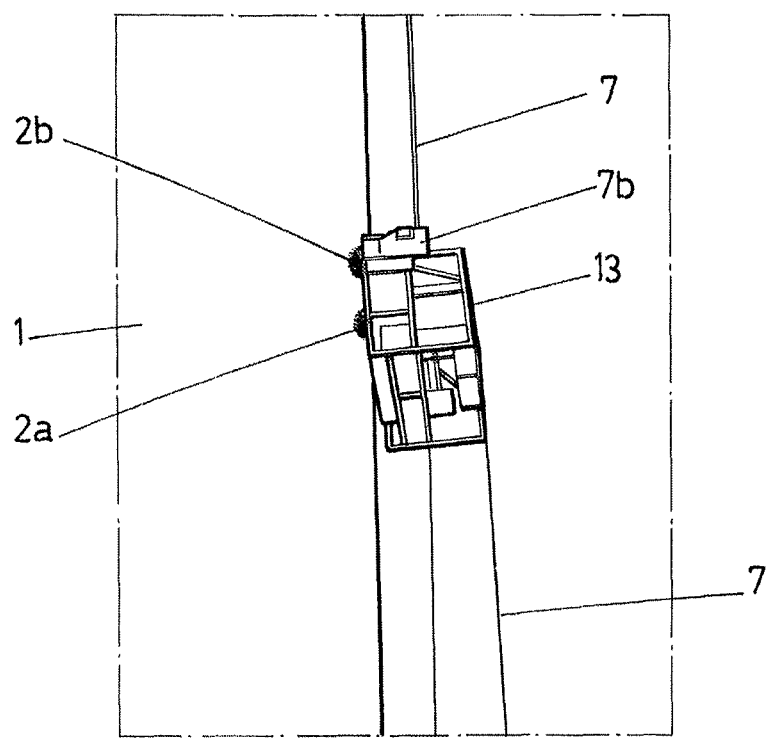
FIG. 4 shows a three-dimensional view of the lifting of the cleaning machine which is the object of the invention.

A plurality of magnets (3) facing part of the outer surface of the mast (1), which are configured to attract the machine with regard to said mast (1) via magnetic phenomena, which are distributed in two upper and lower areas, as can be seen in FIG. 3.

A pair of tanks (4a, 4b) configured to house a cleaning product, each located in correspondence with each flexible roller (2a, 2b) such that one of them supplies a detergent to the first flexible roller (2a) and the other tank (2b) a defoamer, wherein said supply is carried out thanks to each tank (4a, 4b) is associated with a pumping element of the cleaning product to be housed inside said tanks (4a, 4b), said pumping being controlled via the remote control means (6).

A plurality of rolling means (5) located between the structure and said mast (1), which are distributed in two upper and lower areas, as can be seen in FIG. 3.

Figure 5:
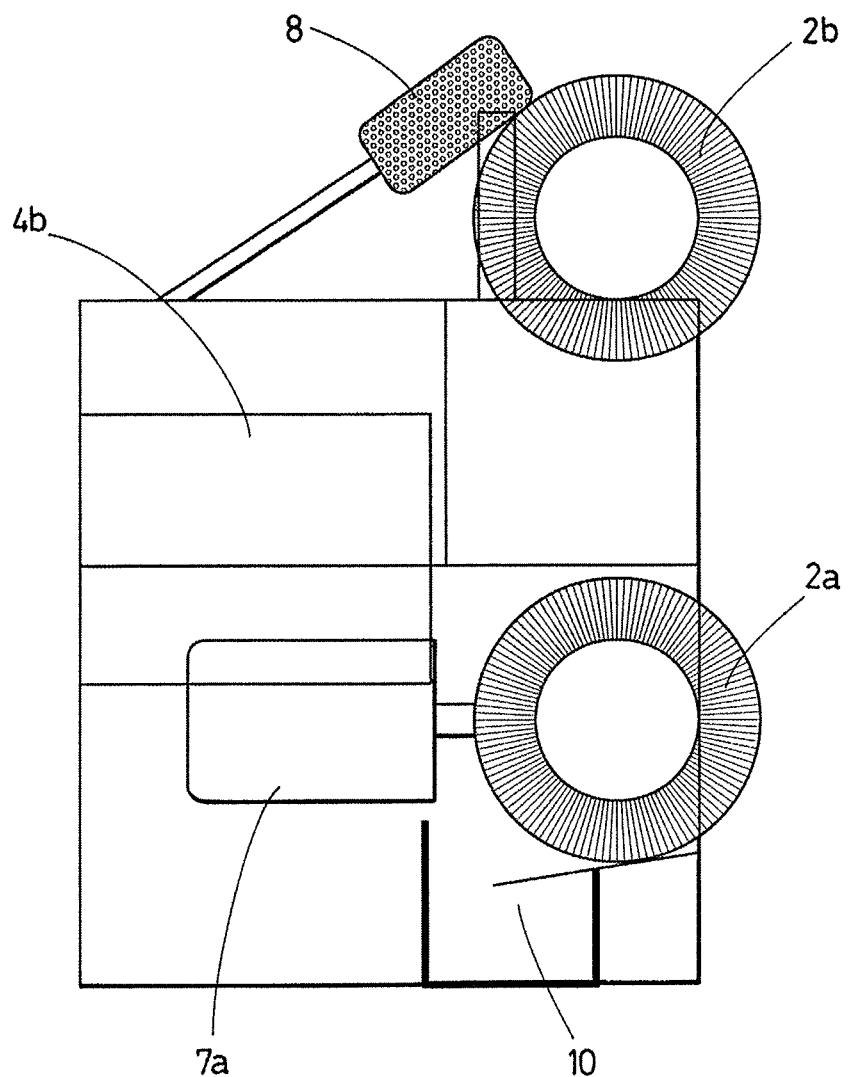
FIG. 5 shows a first two-dimensional view of the cleaning machine which is the object of the invention.
Figure 6:
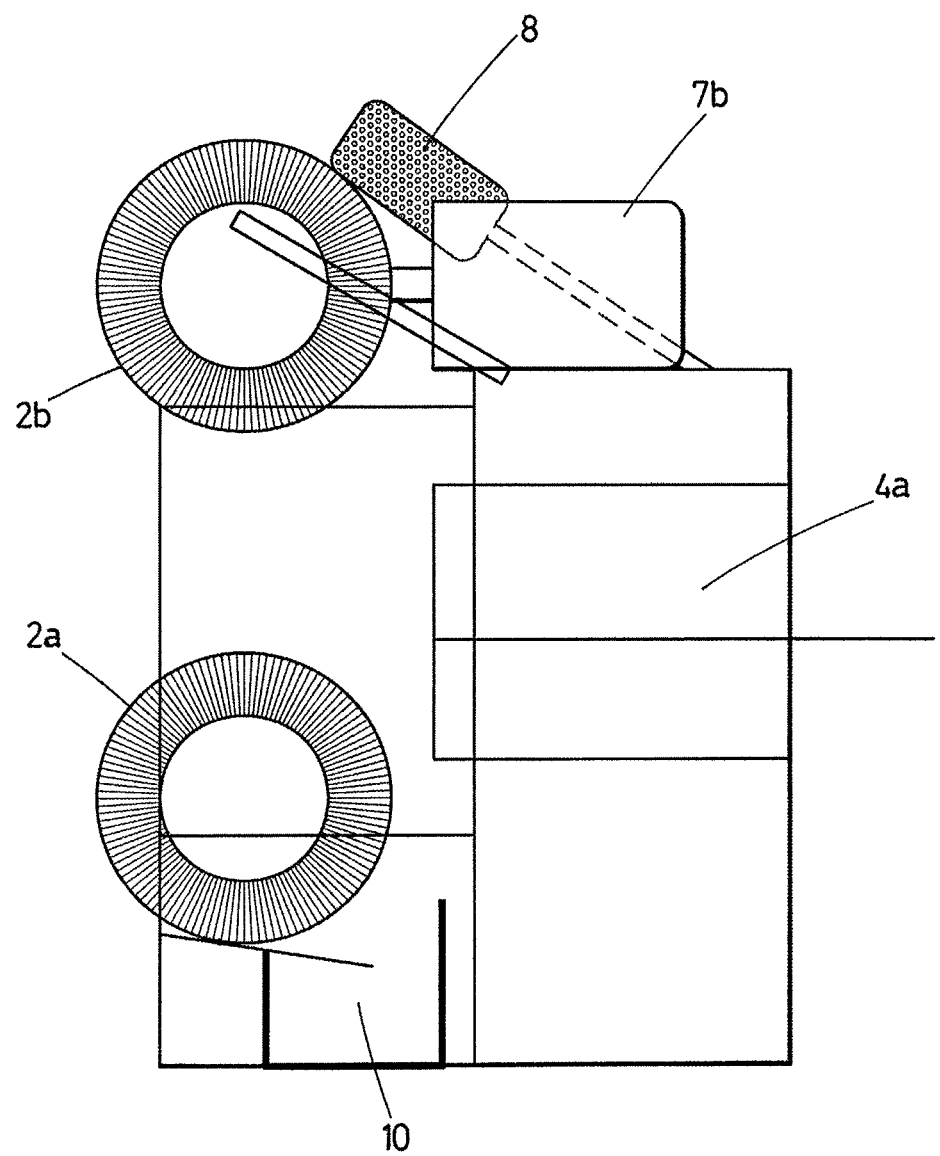
FIG. 6 shows a second two-dimensional view of the lifting of the cleaning machine which is the object of the invention.

A sponge (8) located in the vicinity of one of the flexible rollers (2b), said sponge (8) being configured to absorb some of the cleaning product retained in said flexible roller (2b), as can be seen in FIGS. 1, 5 and 6. Likewise, it should be stressed that said sponge (8) is coupled to a motor configured to alternately move said sponge (8) with regard to the static position of the axis of rotation of the flexible roller (2b), said alternate motion being controlled via the remote control means (6).

A retractable lip (9) located in the vicinity of one of the flexible rollers (2a), wherein said lip (9) has two operating positions: a first cleaning position, wherein the retractable lip (9) is in contact with the surface of the mast (1), and a standby position, wherein the retractable lip (9) is separated a distance with regard to the surface of the mast (1), performing a similar function to that of a baize, wherein said retractable lip (9) can be seen in FIG. 1 in its standby position.

A receptacle (10) inferiorly located with regard to one of the flexible rollers (2b) and configured to collect waste products after the cleaning of the mast (1) by gravitational action, as can be seen in FIGS. 5 and 6.

Finally, it is observed the existence of an anti-projection screen (11) configured to direct the used cleaning product towards the lower receptacle so that it thereby is not expelled towards the surroundings of the mast (1) of the wind turbine.

The towers of wind turbines are metallic and made of materials such as steel so as to thereby to take advantage the magnetic properties of the magnets present inside the cleaning machine.

In order to increase the safety of the machine which is the object of the invention, the lifting means (7) are provided with a safety system against failures of the lifting means (7) themselves, wherein said safety system has at least one tie wire anchored, on the one hand, to the machine and, on the other, to the top portion of the mast (1).

The existence of a lower, seal-like closure (12), whose purpose is to prevent potential fouled cleaning or waste products pass into the base ground of the mast (1), in accordance with environmental and conservation policies and protection of the environment where the associated wind turbine is located, can be seen in FIG. 1.

In accordance with to the machine described in the preferred embodiment, a exterior cleaning process in wind turbine-tower associated with said machine, which has the following steps, is described below:

a) coupling the machine to the corresponding lifting means (7) with regard to the mast (1) of the wind turbine;

b) positioning the machine in the vicinity of the outer surface of the mast (1), having the plurality of magnets (3) facing regarding to said surface, attracting the machine to the surface of the mast (1) through the existing magnetic forces, and contacting the rolling means (5) with said surface of the mast (1);

c) injecting the cleaning product onto said at least one flexible roller (2a, 2b) via the corresponding remote control means (6);

d) rotating both flexible rollers (2a, 2b) in contact with part of the surface of the mast (1), again via the corresponding remote control means (6); and e) actuating, via the remote control means (6), the lifting of said machine such that it begins to go up by the mast (1).

Once the cleaning of one of the outer surfaces of the mast (1) is complete, proceeds to rotate the cleaning machine and continue cleaning the remaining outer surface of the mast (1) in a fast and safe manner.

Based on this description and the set of figures, the skilled in the art will understand that the embodiments of the invention described can be combined in multiple ways within the scope of the invention. The invention has been described according to some preferred embodiments thereof, but for the skilled in the art it shall be evident that multiple variations can be entered in said preferred embodiments without exceeding the scope of the invention claimed.

The invention claimed is:

1. A system which comprises an exterior cleaning machine for cleaning a metallic wind turbine tower, wherein said machine comprises the following components:

(a) at least one flexible roller (2a, 2b) configured to come in contact with part of the surface of the mast (1) of a wind turbine;

(b) a plurality of magnets (3) facing part of the outer surface of the mast (1) and configured to attract said machine with regard to the mast (1);

(c) at least one tank (4a, 4b) configured to hold a cleaning product;

(d) a plurality of rolling means (5) located between a structure and the mast (1);

(e) remote control means (6) of the lifting motion of said machine which are associated with said lifting means (7);

(f) a sponge (8) located in the vicinity of said at least one flexible roller (2a, 2b), and configured to absorb some of the cleaning product retained in said at least one flexible roller (2a, 2b);

(g) a receptacle (10) inferiorly located with regard to said at least one flexible roller (2a, 2b), and configured to collect waste products after cleaning of the mast by gravitational action; and (h) a frame (13) that encompasses the components (a)-(g) and on which the components (a)-(g) are positioned, said frame being coupled to lifting means (7) for lifting the frame in a direction parallel to the mast (1) of the wind turbine.

2. System which comprises an exterior cleaning machine according to claim 1, wherein said lifting means (7) comprise a motor-operated hoist anchored, on the one hand, to the top portion of the mast (1) and, on the other, to the base of the mast (1), and coupled, in turn, to the cleaning machine itself.

3. System which comprises an exterior cleaning machine according to claim 1, wherein said at least one tank (4a, 4b) is associated with a pumping element of the cleaning product to be housed inside said tank (4a, 4b), said pumping being controlled via said remote control means (6).

4. System which comprises an exterior cleaning machine according to claim 1, wherein said at least one flexible roller (2a, 2b) is coupled to a motor (7a, 7b) configured to rotate said flexible roller (2a, 2b) via its axis of rotation, said rotation being controlled via said remote control means (6).

5. System which comprises an exterior cleaning machine according to claim 1, wherein said sponge (8) is coupled to a motor configured to alternately move said sponge (8) with regard to the static position of the axis of rotation of the flexible roller (2a, 2b), and said alternate motion being controlled via said remote control means (6).

6. System which comprises an exterior cleaning machine according to claim 1, and further comprising a retractable lip (9) located in the vicinity of said at least one flexible roller (2a, 2b), which has two operating positions:

a first cleaning position, wherein the retractable lip (9) is in contact with the surface of the mast (1); and a standby position, wherein the retractable lip (9) is separated a distance with regard to the surface of the mast (1).

7. System which comprises an exterior cleaning machine according to claim 1, wherein said at least one flexible roller (2a, 2b) comprises an anti-projection screen (11), said screen (11) being configured to direct the used cleaning product towards the lower receptacle.

8. System which comprises an exterior cleaning machine according to claim 1, further comprising a safety system against failures of said lifting means (7), wherein said safety system has at least one tie wire anchored, on the one hand, to the machine and, on the other, to the top portion of the mast (1).

9. System which comprises an exterior cleaning machine according to claim 1, wherein the cleaning product is a detergent.

10. System which comprises an exterior cleaning machine according to claim 1, wherein the cleaning product is a defoamer.

11. An exterior cleaning process on wind turbine towers of the system defined in claim 1, wherein said process comprises the following steps:
   a) coupling the machine to the corresponding lifting means (7) with regard to the mast (1) of the wind turbine;
   b) positioning the machine in the vicinity of the outer surface of the mast (1), facing the plurality of magnets (3) with respect to said surface, attracting the machine to the surface of the mast (1) through the existing magnetic forces, and contacting the rolling means (5) with said surface of the mast (1);
   c) injecting the cleaning product onto said at least one flexible roller (2a, 2b);
   d) rotating said at least one flexible roller (2a, 2b) in contact with part of the surface of the mast (1); and
   e) actuating, via said remote control means (6), the lifting of said machine.

12. The system of claim 1, wherein the at least one flexible roller comprises means for retaining the cleaning product and for applying the cleaning product to the surface of the mast of the wind turbine to clean the surface.

13. The system of claim 12, wherein the plurality of magnets are configured to attract the machine to the tower to insure that the at least one flexible roller stays in fixed contact with the surface of the tower.

14. The system of claim 13, wherein said at least one tank is associated with a pumping element for pumping the cleaning product from the at least one tank to the at least one flexible roller.

15. The system of claim 14, wherein the at least one flexible roller is coupled to a motor configured to rotate said flexible roller around an axis of rotation of the at least one flexible roller.

* * * * *